United States Patent
Kompella et al.

(10) Patent No.: US 11,165,691 B1
(45) Date of Patent: Nov. 2, 2021

(54) ASSIGNMENT OF SEGMENT IDENTIFIERS IN SEGMENT ROUTING

(71) Applicant: Juniper Networks, Inc., Sunnyvale, CA (US)

(72) Inventors: Kireeti Kompella, Los Altos, CA (US); Ronald P. Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/877,870

(22) Filed: May 19, 2020

(51) Int. Cl.
*H04L 12/721* (2013.01)
*H04L 12/741* (2013.01)
*H04L 12/24* (2006.01)
*H04L 12/723* (2013.01)
*H04L 29/12* (2006.01)

(52) U.S. Cl.
CPC .......... *H04L 45/34* (2013.01); *H04L 41/0806* (2013.01); *H04L 45/507* (2013.01); *H04L 45/74* (2013.01); *H04L 61/2015* (2013.01)

(58) Field of Classification Search
CPC ......... H04L 45/12; H04L 45/34; H04L 45/38; H04L 45/42; H04L 45/44; H04L 45/26; H04L 45/58; H04L 45/507; H04L 45/74; H04L 61/2015; H04L 61/6022; H04L 41/0806; H04L 61/2007; H04L 29/12811; H04L 65/1016; H04L 12/2834; H04L 29/12226; H04L 61/2053; H04L 29/12216; H04L 29/12273; H04L 29/12301; H04L 29/1232; H04L 49/35; H04W 88/16; H04W 76/19
See application file for complete search history.

(56) References Cited

U.S. PATENT DOCUMENTS

| | | | |
|---|---|---|---|
| 7,483,399 B2 * | 1/2009 | Zelig | H04L 12/42 370/258 |
| 8,040,901 B1 | 10/2011 | Kompella et al. | |
| 9,413,605 B2 | 8/2016 | Kompella | |
| 9,438,473 B2 | 9/2016 | Kompella | |
| 9,692,693 B2 | 6/2017 | Kompella | |
| 9,729,455 B2 | 8/2017 | Kompella | |
| 10,541,912 B2 | 1/2020 | Singh et al. | |
| 2007/0237148 A1* | 10/2007 | Jabr | H04L 12/467 370/392 |

(Continued)

OTHER PUBLICATIONS

Filsfils et al., "Segment Routing Architecture," Internet Engineering Task Force (IETF), RFC 8402, Jul. 2018, 33 pp.

(Continued)

*Primary Examiner* — Backhean Tiv
*Assistant Examiner* — Linh T. Nguyen
(74) *Attorney, Agent, or Firm* — Shumaker & Sieffert, P.A.

(57) ABSTRACT

This disclosure describes techniques relating to assigning unique segment identifiers (SIDs) in a segment routing network. In one example, this disclosure describes a method that includes receiving, by a computing system and from a node on a network, a request to allocate a segment identifier for use in a segment routing network; allocating, by the computing system and from a block of addresses, an assigned segment identifier; responding to the request by outputting, by the computing system and over the network to the node, information about the assigned segment identifier; and maintaining the assigned segment identifier.

16 Claims, 5 Drawing Sheets

(56) References Cited

U.S. PATENT DOCUMENTS

| | | | | |
|---|---|---|---|---|
| 2009/0296567 A1* | 12/2009 | Yasrebi | ............... | H04L 41/0813 370/221 |
| 2011/0231450 A1* | 9/2011 | Sinha | .................... | G06F 16/256 707/802 |
| 2012/0136963 A1* | 5/2012 | Goto | .................. | H04L 65/1069 709/217 |
| 2015/0103780 A1* | 4/2015 | Kaippallimalil | ...... | H04W 60/00 370/329 |
| 2015/0237018 A1* | 8/2015 | Parry | .................. | H04L 61/2015 713/162 |
| 2016/0112370 A1* | 4/2016 | Theogaraj | ........... | H04L 61/2092 709/245 |
| 2017/0214657 A1* | 7/2017 | Dhawane | ............ | H04L 61/2015 |
| 2017/0346718 A1* | 11/2017 | Psenak | .................... | H04L 45/02 |
| 2018/0041420 A1* | 2/2018 | Saad | ........................ | H04L 45/22 |
| 2018/0309715 A1* | 10/2018 | Li | .......................... | H04L 29/12 |
| 2019/0028897 A1* | 1/2019 | Ying | ........................ | H04L 67/12 |
| 2019/0068684 A1* | 2/2019 | Tsahhirov | ................ | H04L 67/02 |
| 2019/0223018 A1* | 7/2019 | Norrman | ......... | H04W 12/00518 |
| 2019/0260709 A1* | 8/2019 | Gu | ........................ | H04L 61/2053 |
| 2020/0195556 A1* | 6/2020 | Tang | ........................ | H04L 45/566 |
| 2020/0244758 A1* | 7/2020 | Enguehard | ............ | H04L 67/327 |
| 2020/0358698 A1* | 11/2020 | Song | ........................ | H04L 69/22 |

OTHER PUBLICATIONS

Bonica et al., "Segment Routing Mapped To IPv6 (SRm6)," Spring Working Group, Internet-Draft, Nov. 19, 2019, 25 pp.

Gredler et al., "North-Bound Distribution of Link-State and Traffic Engineering (TE) Information Using BGP," nternet Engineering Task Force (IETF), RFC 7752, Mar. 2016, 49 pp.

Filsfils et al., "Segment Routing Architecture," draft-ietf-spring-segment-routing-15, Network Working Group, Internet-Draft, Jan. 25, 2018, 32 pp.

Moy, "OSPF Version 2," Network Working Group, RFC 2328, Apr. 1998, 244 pp.

Coltun et al., "OSPF for IPv6," Network Working Group, RFC 5340, Jul. 2008, 95 pp.

Sheth et al., "OSPF Hybrid Broadcast and Point-to-Multipoint Interface Type," Internet Engineering Task Force (IETF), RFC 6845, Jan. 2013, 10 pp.

Lindem et al., "OSPFv3 Link State Advertisement (LSA) Extensibility," Internet Engineering Task Force (IETF), RFC 8362, Apr. 2018, 34 pp.

Oran, "OSI IS-IS Intra-domain Routing Protocol," Network Working Group, RFC 1142, Feb. 1990, 217 pp.

Li et al., "IS-IS Extensions for Traffic Engineering," Network Working Group, RFC 5305, Oct. 2008, 18 pp.

Vasseur et al., "Path Computation Element (PCE) Communication Protocol (PCEP)," Network Working Group, RFC 5440, Mar. 2009, 88 pp.

Enns et al., "Network Configuration Protocol (NETCONF)," Internet Engineering Task Force (IETF), RFC 6241, Jun. 2011, 114 pp.

U.S. Appl. No. 16/117,059, filed Aug. 30, 2018, entitled Bandwidth Management for Resource Reservation Label Switched Path of a Ring Network.

* cited by examiner

ASSIGNMENT OF SEGMENT IDENTIFIERS IN SEGMENT ROUTING

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly use label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques, such as by using a Source Packet Routing in Networking (SPRING) paradigm, that provides segment routing within an IGP domain to advertise single or multi-hop LSPs. SPRING includes multiple different segment identifier (SID) types including "adjacency" SIDs and "node" (e.g., "prefix", usually associated with loopback addresses) SIDs. Furthermore, there may be multiple SIDs associated with a prefix, one for each prefix-SID algorithm. In the case of SPRING using MPLS, node SIDs are mapped to labels for use in forwarding. To forward a packet through the network, the routers may push (and pop) one or more labels in a label stack, e.g., a segment list, that is applied to the packet as it is forwarded through the network. SRm6 also has the notion of prefix SIDs and node SIDs.

SUMMARY

This disclosure describes techniques that include assigning unique segment identifiers (SIDs) in a segment routing network. In some examples, a computing system may be used to allocate, manage, and/or assign unique node SIDs to devices on a network, where the network could be any type of network, including segment routing networks, ring networks, anycast networks, SRv6 networks, SRv6+ networks, SRm6 networks, and/or other networks. As described herein, a computing system allocates, manages, and/or assigns unique node SIDs to devices on a network, and streamlines at least some administrative aspects of handling SIDs that might otherwise be performed manually or less efficiently. In some examples, administering node SIDs may be performed using dynamic host configuration protocol (DHCP). In such an example, a computing system on a network uses DHCP to manage global assignment and allocation of SIDs.

The techniques described herein may provide certain technical advantages. For instance, use of DHCP to assign and otherwise manage allocation of SIDs may reduce or eliminate at least some of the burdens on an administrator and ensure their uniqueness within the network domain. By reducing such burdens and/or by eliminating manual allocation and configuration of SIDs, a network that relies on accurate allocation and configuration of SIDs may operate more efficiently and with fewer routing and other errors. Further, appropriately allocating and managing globally-unique SIDs may enable simplified protections against failures in ring networks and other types of networks, and also enables simplified forwarding procedures.

In some examples, this disclosure describes operations performed by a network device in accordance with one or more aspects of this disclosure. In one specific example, this disclosure describes a method comprising receiving, by a computing system and from a node on a network, a request to allocate a segment identifier for use in a segment routing network; allocating, by the computing system and from a block of SIDs, an assigned segment identifier; responding to the request by outputting, by the computing system and over the network to the node, information about the assigned segment identifier; and maintaining, by the computing system, the assigned segment identifier.

In another example, this disclosure describes a system configured to perform operations comprising receiving, by a computing system and from a node on a network, a request to allocate a segment identifier for use in a segment routing network; allocating, by the computing system and from a block of SIDs, an assigned segment identifier; responding to the request by outputting, by the computing system and over the network to the node, information about the assigned segment identifier; and maintaining, by the computing system, the assigned segment identifier.

DETAILED DESCRIPTION

Node and ring segment identifier (SIDs) assignments in a particular domain (such as an IGP area or an Autonomous System) should follow certain rules: they should be allocated from a configured set of SID blocks and they should be unique. In some cases, it may also be useful for SID assignments to be "sticky." This may mean that the same SIDs or value(s) previously assigned to a node are reassigned to that node if its assignment expires (as might happen if the "lease" for the assignment expires, or the node resets; in either case, the node re-requests a SID). In some examples described herein, the Dynamic Host Configuration Protocol is used to handle assignment of SIDs within a network.

Segment routing, which may also be referred to as source packet routing or source packet routing in networking (SPRING), is a control-plane architecture that enables an ingress router to steer a packet through a specific set of nodes and links in a network without relying on intermediate nodes in the network to determine the path it should take. Fundamental to SPRING forwarding is the notion of Segment Identifiers (SIDs). See C. Filsfils, et al., "Segment Routing Architecture," Internet Engineering Task Force (IETF) RFC 8402, July 2018, the entire contents of which are incorporated herein by reference. At a high level, there are two types of SIDs: those that are locally assigned by the advertising node, such as adjacency, binding and BGP-peering SIDs (hereinafter "adjacency SIDs"); and those that are globally unique within a given SPRING domain, such as IGP-prefix and BGP-prefix SIDs (for both IPv4 and IPv6 prefixes), anycast SIDs and ring SIDs (hereinafter "node SIDs"). SRm6 also has the notion of adjacency SIDs and node SIDs. (See, e.g., See https://tools.ietf.org/html/draft-bonica-spring-sr-mapped-six-00#section-4, which is hereby incorporated by reference.) Techniques described herein apply to the allocation and maintenance of all types of globally unique SIDs, including node SIDs for SPRING and SRm6.

Techniques described herein apply to many types of networks, not just ring networks. However, ring networks may have attributes that may tend to increase the administrative burden associated with assignment of node SIDs. Node SIDs are often manually configured on routers, which is not only tedious, but error-prone. Errors associated with assignment and allocation of SIDs can have significant detrimental consequences to a network. Where ring networks increase the administrative burden associated with managing SIDs, manual configuration and/or assignment of SIDs on ring networks on ring networks can be even more fraught.

Figure 1A:
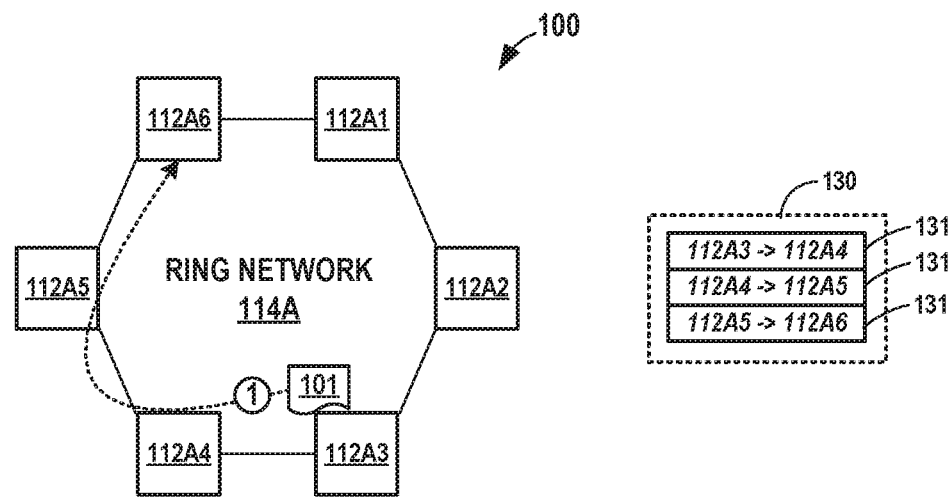
FIG. 1A, FIG. 1B, FIG. 1C, and FIG. 1D are block diagrams illustrating example ring networks in which packets are routed using segment routing, in accordance with one or more aspects of the present disclosure.
Figure 1B:
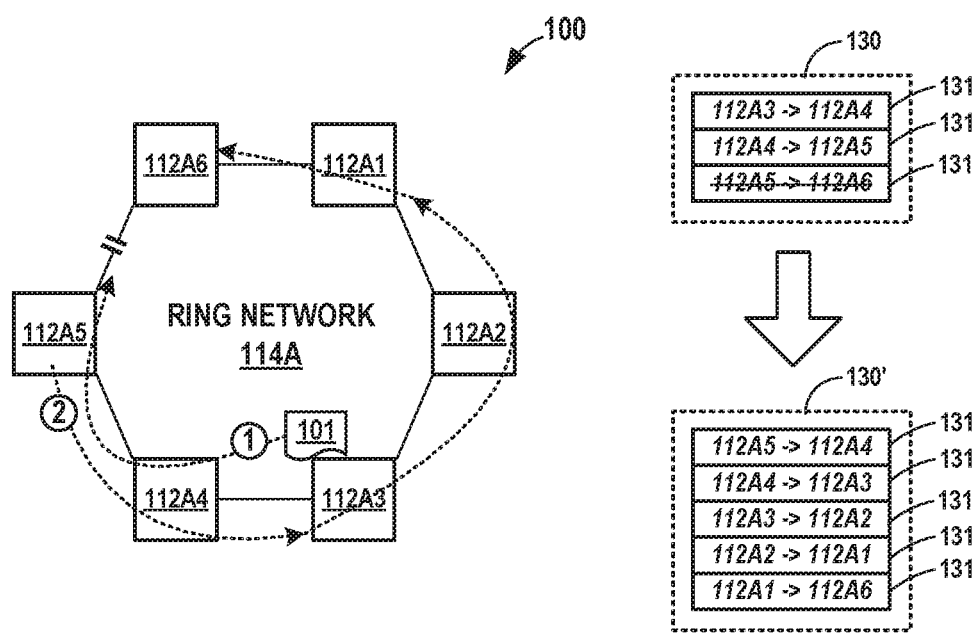

FIG. 1A, FIG. 1B, FIG. 1C, and FIG. 1D are block diagrams illustrating example ring networks in which packets are routed using segment routing, in accordance with one or more aspects of the present disclosure. In the examples of FIG. 1A and FIG. 1B, packets are routed using adjacency SIDs, whereas in the examples of FIG. 1C and FIG. 1D, packets are routed using node SIDs.

For ease of illustration, each of FIG. 1A, FIG. 1B, FIG. 1C, and FIG. 1D illustrate only one network, namely, ring network 114A. In other examples, however, other networks may be included within network system 100, including other ring networks (e.g., ring networks 114B and 114C) and non-ring networks.

In FIG. 1A, and in accordance with one or more aspects of the present disclosure, network system 100 may prepare to route packet 101 over ring network 114A using segment routing techniques. For instance, in an example that can be described with reference to FIG. 1A, router 112A3 receives packet 101 (e.g., from a device, not shown). Router 112A3 determines that packet 101 is destined for router 112A6. Router 112A3 determines that the shortest path to router 112A6 is in the clockwise direction around ring network 114A. Router 112A3 determines a series of segments along a path to router 112A6 in the clockwise direction. Specifically, router 112A3 determines that packet 101 should travel from router 112A3 to router 112A4, then to router 112A5, and then to router 112A6 along the links illustrated in FIG. 1A between those routers 112. Router 112A3 creates label stack 130 by pushing a series of labels onto label stack 130. In label stack 130, each label in the series of labels corresponds to an adjacency SID in a sequence of adjacencies along a path to router 112A6 from router 112A3. In the example shown in FIG. 1A, label stack 130 includes three labels, one for each of the links between router 112A3 and router 112A6 (i.e., router 112A3 to 112A4, router 112A4 to 112A5, and router 112A5 to 112A6).

Network system 100 may route packet 101 to router 112A6 using label stack 130. For instance, continuing with the example being described with reference to FIG. 1A, router 112A3 evaluates label 131 at the top of label stack 130. Router 112A3 determines that label 131 at the top of label stack 130 indicates that packet 101 should be routed to router 112A4 (i.e., in a clockwise direction around ring network 114A). Router 112A3 pops the top label 131 off of label stack 130 and routes packet 101 to router 112A4. Router 112A4 receives packet 101 from router 112A3. Router 112A4 evaluates label 131 now at the top of label stack 130, and determines that it indicates that packet 101 should be routed to router 112A5, again in the clockwise direction around ring network 114A. Router 112A4 pops the top label 131 off label stack 130 and routes packet 101 to router 112A5. Router 112A5 receives packet 101 from router 112A4, evaluates label stack 130, and determines that label 131 at the top of label stack 130 indicates that packet 101 should now be routed to router 112A6. Router 112A5 again pops the top label 131 off label stack 130 and routes packet 101 to router 112A6, its final destination. Router 112A6 receives packet 101 and determines that label stack 130 no longer holds any labels 131.

As described, in the example illustrated in FIG. 1A, a series of adjacencies (e.g., each corresponding to an adjacency SID) between router 112A3 and router 112A6 are used to route packet 101 to its destination. Such a scheme works well when there are no link failures or errors along the path between router 112A3 and router 112A6. However, if there is a link failure along the path, the example illustrated in FIG. 1A might not work as efficiently.

FIG. 1B is a block diagram illustrating an example ring network having a link failure and in which packets are routed using adjacency SIDs. As illustrated in FIG. 1B, the link between router 112A5 and router 112A6 is broken (note the separated link between router 112A5 and router 112A6 in FIG. 1B).

In FIG. 1B, as described in FIG. 1A, router 112A3 may receive packet 101 and route packet 101 to router 112A5. For instance, in an example that can be described with reference to FIG. 1B, router 112A3 determine a series of segments along a path to router 112A6. Router 112A3 creates label stack 130 by pushing a series of labels corresponding to a series of adjacencies (i.e., adjacency SIDs) between router 112A3 and router 112A6. Each of routers 112 along the path uses label stack 130 to route packet 101 to router 112A5 as described in FIG. 1A.

Router 112A5 may detect a failed link and reroute packet 101. For instance, in the example being described with reference to FIG. 1B, router 112A5 receives packet 101 and determines that it cannot route packet 101 to router 112A6 (i.e., note the failed link leading to router 112A6). Router 112A5 discards label stack 130 and all labels 131 remaining in label stack 130. Router 112A5 creates (or causes to be created) a new label stack 130', with a new set of labels 131 that route packet 101 along a new path avoiding the failed link. In the example of FIG. 1B, the new path involves routing packet 101 all the way back around packet 101 in a counterclockwise direction. Router 112A5 routes packet 101 back to router 112A4. Each of routers 112 along the counterclockwise path continue to route packet 101 in the counterclockwise direction in 114A until packet 101 arrives at router 112A6, assuming there are no other failures along the way.

In the example just described, remedying a link failure may require discarding an existing label stack 130 and creating a new label stack 130'. Such a process is complicated, inefficient, and/or costly. Accordingly, for a ring-based network using segment routing in which a stack of labels based on adjacency SIDs is used to route packets, the protection against failure is often complicated. Similarly, forwarding in the presence of such a failure is often complicated and inefficient.

Figure 1C:
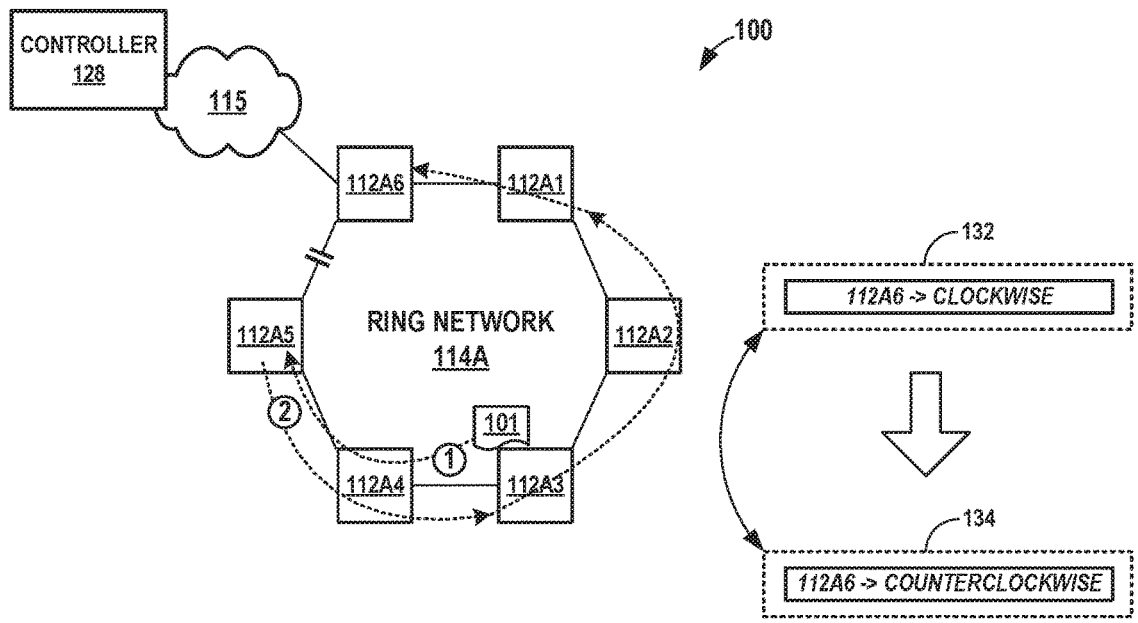
Figure 1D:
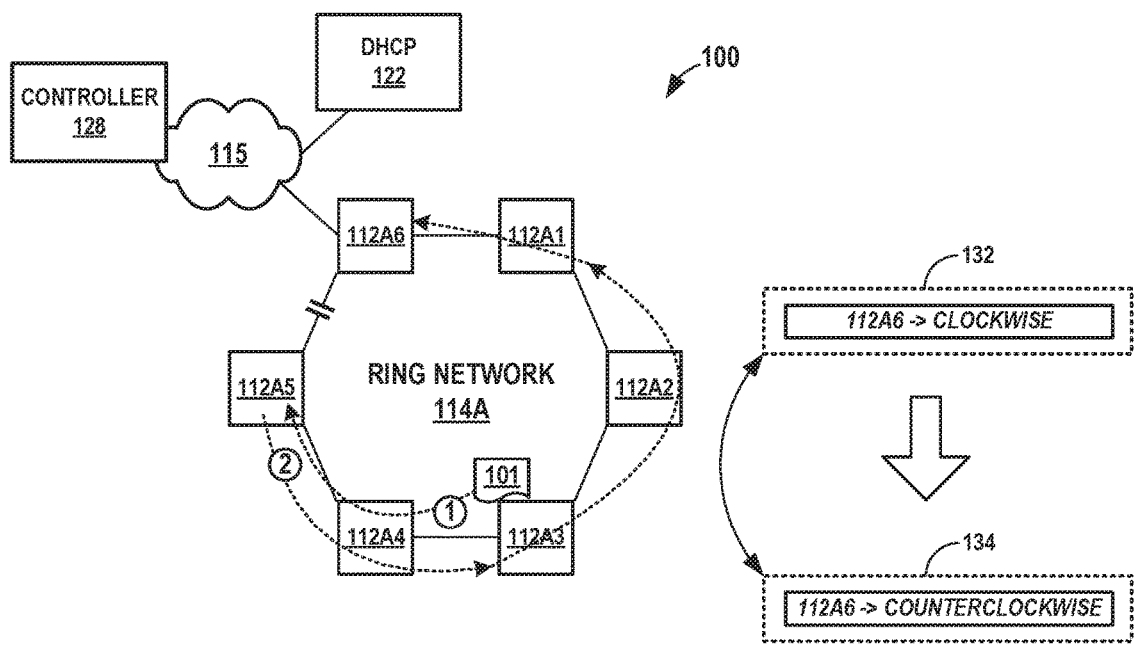

FIG. 1C and FIG. 1D are block diagrams illustrating an example ring network experiencing a link failure and in which packets are routed using node SIDs. In the examples of FIG. 1C and FIG. 1D, rather than using adjacency SIDs to route packets (e.g., packet 101) within ring network 114A, node SIDs are used to route packets. In examples described herein with respect to FIG. 1C and FIG. 1D, a clockwise and counterclockwise semantic may be used, rather than using the shortest cost path semantic. In such examples, to route a packet in a segment routing network (e.g., ring network 114A), a label that corresponds to a node SID is applied to packet 101, and each of routers 112 within ring network 114A use that label to determine whether to route packet 101 in the clockwise direction or in the counterclockwise direction within ring network 114A. Since there are two directions in which a packet may be forwarded in ring network 114A to reach a given destination, each of routers 112 within 114A may be assigned a different pair of unique node SIDs: one for the clockwise direction around ring network 114A, and another for the counterclockwise direction. Each of routers 112 announce its pair of node SIDs (e.g., using IGP), thereby informing each of the other routers 112 how to route packets to it. Each of routers 112 may route a given packet by evaluating the label included within the packet, and determining whether the label indicates whether the packet should be routed in the clockwise direction or in the counterclockwise direction. Each of routers 112 then routes the label in accordance with the direction indicated by the label.

In FIG. 1C, and in accordance with one or more aspects of the present disclosure, router 112A6 may be configured, by an administrator, with a pair of unique node SIDs. For instance, in an example that can be described with reference to FIG. 1C, router 112A6 detects input that it determines corresponds to information about one or more node SIDs. In some examples, the input may be received from controller 128 through network 115 in response to administrator input. In other examples, the input detected by router 112A6 may be detected from another source. Router 112A6 further determines that the input includes a first node SID that corresponds to a route to router 112A6 in the clockwise direction around ring network 114A, and a second node SID that corresponds to a route to router 112A6 in the counterclockwise direction around ring network 114A. Router 112A6 configures itself with these node SIDs.

Router 112A6 may advertise routes for reaching router 112A6 in both the clockwise and counterclockwise direction. For instance, continuing with the example being described, router 112A6 advertises both routes (e.g., using IGP) associated with routing packets to router 112A6. Each of routers 112 on ring network 114A receive and store information about the advertised routes.

Each of routers 112 in ring network 114A may similarly advertise routes in both the clockwise and counterclockwise direction. For instance, still continuing with the example being described with reference to FIG. 1C, each of routers 112 within ring network 114A (e.g., routers 112A1 to 112A5) detect input (e.g., again from an administrator) that each determines corresponds to information about a pair of node SIDs, one for each of the clockwise and counterclockwise direction within ring network 114A. Each of routers 112 within ring network 114A make appropriate configurations that reflect the assigned node SIDs. Each of routers 112 within ring network 114A advertise routes consistent with the configured node SIDs (e.g., one route in the clockwise direction, and another in the counterclockwise direction to reach a given router 112). Each of routers 112 within ring network 114A may receive and store information about the advertised routes, so that each of routers 112 has information about how to route packets to each of routers 112 within 114A in both clockwise and counterclockwise directions.

Router 112A3 may route packet 101 over ring network 114A using the routes advertised by router 112A6. For instance, still continuing with the example being described with reference to FIG. 1C, router 112A3 receives packet 101. Router 112A3 determines that packet 101 is destined for router 112A6. Router 112A3 determines that the best path to router 112A6 is in the clockwise direction around ring network 114A. Router 112A3 applies label 132 to packet 101, indicating that packet 101 is destined for router 112A6 in the clockwise direction. Router 112A3 routes packet 101 to router 112A4. Router 112A4 receives packet 101 from router 112A3. Router 112A4 evaluates label 132 and determines that label 132 indicates that packet 101 is destined for router 112A6 in the clockwise direction. Router 112A4 routes packet 101 in the clockwise direction to router 112A5.

Router 112A5 may respond to a failed link by swapping label 132 for label 134. For instance, in the example being described with reference to FIG. 1C, router 112A5 receives packet 101 from router 112A4. Router 112A5 evaluates label 132 and determines that label 132 indicates that packet 101 is destined to router 112A6 in the clockwise direction. However, router 112A5 also determines that it cannot route packet 101 to router 112A6 because of the failed link. In response, router 112A5 swaps label 132 for label 134 to recover from the failed link. Based on label 134, router 112A5 determines that packet 101 is now to be routed around ring network 114A in the counterclockwise direction. Router 112A5 routes packet 101 to router 112A4. Router 112A4 receives packet 101 from router 112A5 and routes packet 101 in the counterclockwise direction. Routers 112 on ring network 114A continue to route packet 101 in the counterclockwise direction until packet 101 arrives at router 112A6, assuming no other failures within ring network 114A.

In the example of FIG. 1C, by using node SIDs and swapping label 132 for label 134, the protection against a link failure or other failure is simplified, as is the forwarding in response to a failure. However, configuration of each of routers 112 may now be more complicated. In particular, in the example being described, some or all of routers 112 may need to be configured with a number of node SIDs, including at least a pair of node SIDs, one for each direction (clockwise and counterclockwise) within ring network 114A. Additionally, some or all of routers 112 may need to be configured with one or more IGP-prefix SIDs for their loopback addresses, and possibly other types of node SIDs. Further, each of such node SIDs should be unique to avoid complications with packet forwarding, such as mis-forwarding of packets.

In some examples, configuration of routers 112 with unique node SIDs may be performed manually, such as by an administrator. However, such manual configuration is complicated, tedious, and error-prone. Further, any errors that are made in configurating unique node SIDs within network system 100 may have significant negative consequences for the operation of network system 100 and ring network 114A in FIG. 1C. One way to more efficiently and effectively assign node SIDs to each of ring networks 114 may be to automate and/or centralize the assignment of unique node SIDs to routers 112.

FIG. 1D illustrates an example network system 100 that is similar to network system 100 of FIG. 1C. FIG. 1D differs from FIG. 1C in that FIG. 1D includes DHCP server 122. In the example described below, DHCP server 122 is used to administer aspects of SIDs within network system 100.

In accordance with one or more aspects of the present disclosure, network system 100 may enable assignment of unique node SIDs to routers 112 using DHCP. For instance, in an example that can be described with reference to FIG. 1D, controller 128 outputs one or more signals to each of routers 112 within ring network 114A. Each of routers 112 detect a signal over ring network 114A and determine that the signal corresponds to information about how to obtain one or more unique node SIDs as needed. Each of routers 112 further determines that the signal includes instructions for sending requests for node SIDs to DHCP server 122. In some examples, such instructions may indicate that for each request, the type and number of SIDs being requested be identified, and what block of SIDs should be used. The type value may indicate that the request is for a node SID, rather than, for example, an IP address.

DHCP server 122 may, in response to such a request for a SID, assign SIDs (e.g., node SIDs) pursuant to a lease. DHCP server 122 may also ensure that the assigned SID(s) are unique. Further, DHCP server 122 may thereafter manage the allocation of the node SIDs. Such management may involve ensuring that no conflicting node SIDs are thereafter assigned, and updating assignments as leases expire. DHCP server 122 may also seek to keep node SID assignments stable and are assigned from the right block. In some examples, DHCP server 122 may seek to ensure that assignments are "sticky," which may mean that a SID of the same type that has been previously assigned to a given router 112 may continue to be assigned to that router 112, where it is practical to do so. Once a given SID or set of SIDs are assigned by DHCP server 122, the assignee of the SIDs (e.g., one of routers 112) may be expected to abide by the lease associated with each assigned SID. Each of routers 112 may use the assigned SIDs within ring network 114A for routing packets. To do so, each of routers 112 may announce clockwise and counterclockwise SIDs for being reached within ring network 114A. Each of routers 112 and may also re-request a node SID if a given router 112 restarts or the lease expires.

Accordingly, each of routers 112 may use DHCP server 122 to obtain a pair of unique node SIDs. For instance, continuing with the example being described with reference to FIG. 1D, router 112A6 determines, during configuration or otherwise, that it is part of segment routing-based ring network 114A. Router 112A6 determines that to be reached in both the clockwise and counterclockwise directions within ring network 114A, it should announce a first node SID for the clockwise direction and a second node SID for the counterclockwise direction. Router 112A6 outputs a signal over network 115 to DHCP server 122. DHCP server 122 detects the signal and determines that the signal corresponds to a request for one or more unique node SIDs for router 112A6. DHCP server 122 allocates data from a table of unique addresses that can be used for node SIDs. DHCP server 122 responds to the request by outputting one or more unique node SIDs. Router 112A6 receives a unique node SID for the clockwise direction in ring network 114A and another unique node SID for the counterclockwise direction. Each of the remaining routers 112 within ring network 114A (i.e., routers 112A1 through 112A5) may also issue one or more requests to DHCP server 122 and receive a pair of unique node SIDs, one for the clockwise direction within ring network 114A, and another for the counterclockwise direction.

Furthermore, each of routers 112 may request an IGP-prefix node SID for their loopback address. This node SID can be used by any router in the network, not just those in ring 114A. This node SID may come from the same block as the pair of node SIDs for use in ring forwarding, or from a different SID block. More generally, each of routers 112 may require multiple node SIDs, each of which must be unique within the SPRING domain, and may thus make multiple requests of the DHCP server 122.

In some examples, since each of routers 112 may need two unique node SIDs (one for each of the clockwise and counterclockwise directions), each of routers 112 may request from DHCP server 122 a pair of node SIDs. In other examples, however, one or more of routers 112 may issue to DHCP server 122 two separate and/or independent requests for a node SIDs. In some implementations, DHCP server 122 might not have any need to know or understand any details about how requested node SIDs are being used, and by which of routers 112 they are being used. DHCP server 122 might need to know simply that that requested node SIDs are to be uniquely assigned and/or allocated. Accordingly, from the perspective of DHCP server 122, two separate requests for node SIDs may be viewed the same as a single request for a pair of node SIDs.

Each of routers 112 may advertise routes and route packets. For instance, continuing with the example being described with reference to FIG. 1D, after each of routers 112 obtains a pair of unique node SIDs from DHCP server 122, each of routers 112 uses the node SIDs to determine routes for being reached within ring network 114A or otherwise. Each of routers 112 advertise the determined routes (e.g., using IGP) to each of routers 112 within network system 100. Each of routers 112 may use one of the unique node SIDs for being reached in the clockwise direction within ring network 114A, and each of routers 112 may use another one of the unique SIDs for being reached in the counterclockwise direction within 114A.

Each of routers 112 may route packets based on the advertised routes. Eventually each of routers 112 become aware of each of the node SIDs used for clockwise and counterclockwise routing within ring network 114A. One of routers 112, such as router 112A3, receives packet 101. Router 112A3 evaluates packet 101 and determines that packet 101 includes label 132 indicating that packet 101 is destined for router 112A6 in the clockwise direction. Based on label 132, router 112A3 routes packet 101 in the clockwise direction within ring network 114A. Packet 101 continues to be routed by routers 112 in the clockwise direction within ring network 114A until packet 101 reaches its destination. If one of routers 112 encounters a failure prior to packet 101 reaching its destination, that router 112 swaps label 132 with label 134, and packet 101 is thereafter routed in the counterclockwise direction to its destination.

The techniques described herein may provide certain technical advantages. For instance, by reducing or eliminating manual configuration and/or assignment of where globally unique SIDs, a network relying on such SIDs may operate more reliably, efficiently, and with fewer routing and other errors. Further, by appropriately allocating and managing globally-unique SIDs, techniques for simplified protection against failures in ring networks are possible, as are simplified forwarding procedures.

Although techniques described herein apply to other types of networks, background relating to ring networks is available in U.S. patent application Ser. No. 12/360,609, filed Jan. 27, 2009; U.S. patent application Ser. No. 14/318,953, filed Jun. 30, 2014; U.S. patent application Ser. No. 14/318, 979, filed Jun. 30, 2014; U.S. patent application Ser. No. 14/319,185, filed Jun. 30, 2014; U.S. patent application Ser. No. 14/319,003, filed Jun. 30, 2014; U.S. patent application Ser. No. 15/986,476, filed May 22, 2018; and U.S. patent application Ser. No. 16/117,059, filed Aug. 30, 2018. All of these applications are hereby incorporated herein by reference.

Figure 2:
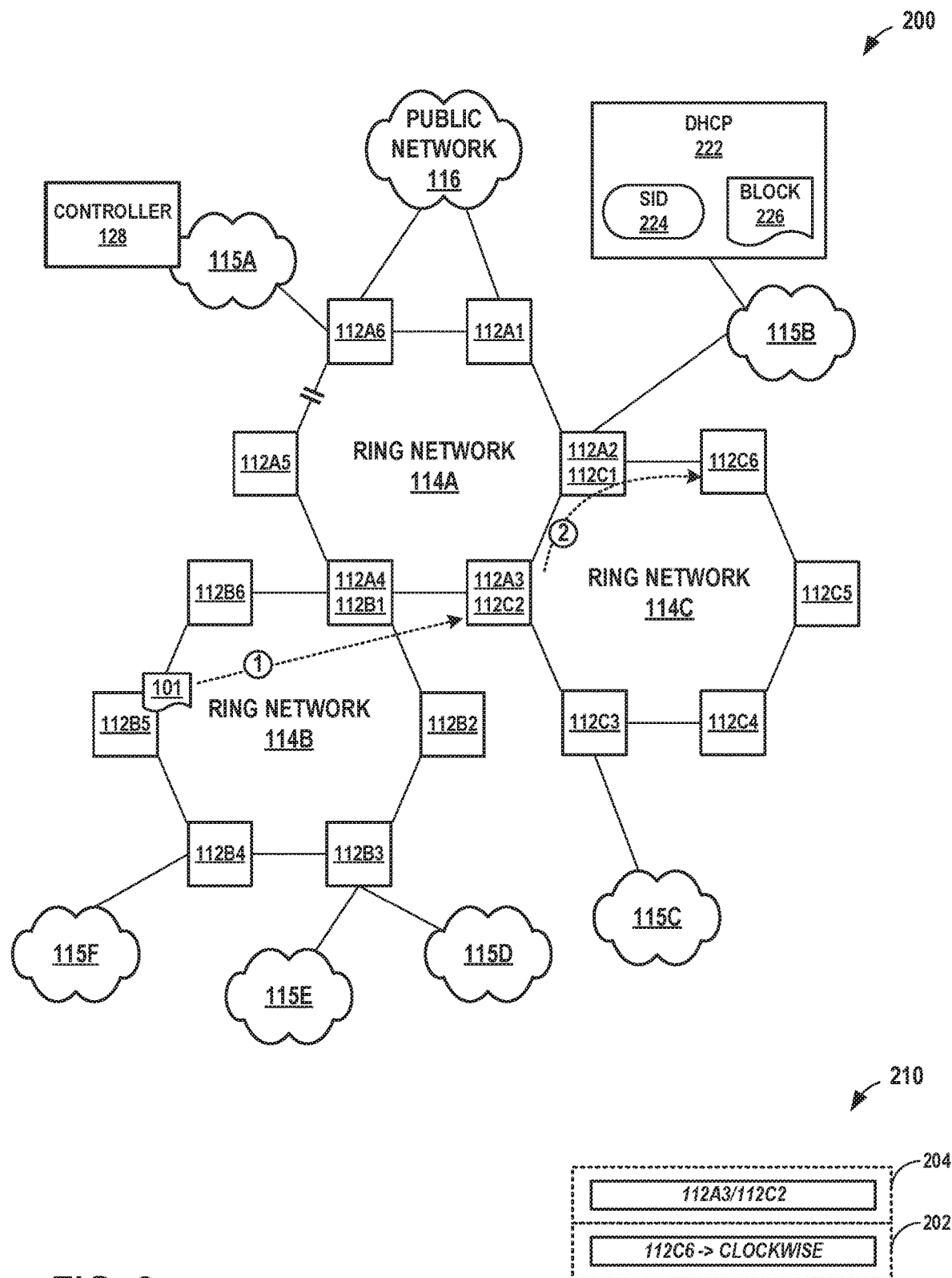
FIG. 2 is a block diagram illustrating a network in which a number of routers are arranged to form a plurality of ring networks, in accordance with one or more aspects of the present disclosure.

FIG. 2 is a block diagram illustrating a network in which a number of routers are arranged to form a plurality of ring networks, in accordance with one or more aspects of the present disclosure. Network system 200 illustrates ring network 114A, ring network 114B, and ring network 114C (collectively "ring networks 114"), each having a collection of routers 112 arranged to form a ring. For example, ring network 114A is formed by router 112A1 through router 112A6 ("routers 112A"), ring network 114B is formed by router 112B1 through router 112B6 ("routers 112B"), and ring network 114C is formed by router 112C1 through router 112C6 ("routers 112C").

In some examples, each of ring networks 114A, 114B, and 114C may operate as access networks for other networks 115 (e.g., networks 115A, 115B, 115C, 115D, and 115E; collectively "networks 115"). Each of networks 115 may be a customer network or a network associated with another type of entity. Each of networks 115 may comprise a private network and may include local area networks (LANs) or wide area networks (WANs) that comprise a plurality of subscriber devices (e.g., including computing devices, workstations, client computers, or virtualized computing devices). One or more of ring networks 114 may provide one or more of networks 115 with access to public network 116 (e.g., the internet) or other networks.

In FIG. 2, some of routers 112 are members of more than one ring network 114. For instance, router 112A2 is a member of ring network 114A, but is also a member of ring network 114C. In FIG. 2, router 112A2 is therefore identified in FIG. 2 with two reference numerals in FIG. 2: 112A2 (indicating its membership as router "2" within ring network 114A) and 112C1 (indicating its membership as router "1" in ring network 114C). Similarly, router 112A3/112C2 is a member of both ring network 114A and ring network 114C, and router 112A4/112B1 is a member of both ring network 114A and ring network 114C.

FIG. 2 also includes DHCP server 222, which may be an example or alternative implementation of DHCP server 122 of FIG. 1C. DHCP server 222 of FIG. 2 includes SID allocation module 224 and SID block 226. SID allocation module 224 may perform functions relating to assigning SIDs to one or more of routers 112 within network system 200. To do so, SID allocation module 224 may allocate unique SIDs from SID block 226. SID block 226 may be a block of globally unique addresses assigned by an administrator or received from another source.

In some examples, SID allocation module 224 of DHCP server 222 may allocate multiple SIDs to one or more of routers 112. For example, when allocating SIDs to routers 112 that are members of two or more ring networks 114, SID allocation module 224 may allocate a pair of unique node SIDs for each different ring network 114 that includes that router 112. So for router 112A2/112C1, for example, SID allocation module 224 of DHCP server 222 may allocate from SID block 226 a pair of unique node SIDs for use in ring network 114A. Router 112A2/112C1 may use the pair of unique node SIDs for advertising routes and routing packets in each of the clockwise and counterclockwise directions within ring network 114A. SID allocation module 224 may also allocate from SID block 226 an additional pair of unique node SIDs for use in ring network 114B. Router 112A2/112C1 may use this additional pair of unique node SIDs for advertising routes and routing packets in each of the clockwise and counterclockwise directions within ring network 114C.

In addition, SID allocation module 224 may allocate additional node SIDs to router 112A2/112C1, beyond the two pairs of node SIDs allocated for use by router 112A2/112C1 in ring networks 114A and 114C. For instance, router 112A2/112C1 may also be a member of a non-ring network within network system 200, and may thus have an additional requirement for a unique node SID for segment routing operations for each such network. Accordingly, router 112A2/112C1 may have a need for five or more unique node SIDs in the example of FIG. 2. Similarly, each of the remaining routers 112 may require a pair of node SIDs for each ring network 114 that each is part of, as well as additional node SIDs for each additional network for which each such router 112 is a member. Accordingly, for network system 200, which may be only slightly more complicated that networks illustrated in FIG. 1A, FIG. 1B, FIG. 1C, and FIG. 1D, the administrative burden for allocating unique node SIDs across network system 200 can be significant, and can quickly escalate with network complexity.

In accordance with one or more aspects of the present disclosure, controller 128 of network system 200 may configure DHCP server 222 to manage allocation of unique node SIDs within network system 200. For instance, in an example that can be described in the context of FIG. 2, SID allocation module 224 of DHCP server 222 detects a signal from controller 128 (e.g., in response to administrator input) over network 115B. SID allocation module 224 determines that the signal corresponds to configurations that enable DHCP server 222 to serve the function of allocating unique SIDs to client devices, such as routers 112. SID allocation module 224 further determines that the signal includes a unicast address, and a command to listen for qualified requests at that unicast address (e.g., from routers 112) and respond to such requests by allocating SIDs from SID block 226. SID allocation module 224 further determines that the signal corresponds to a command to manage the allocated SIDs from SID block 226 like a pool of addresses.

Controller 128 of network system 200 may configure each of routers 112 to request node SIDs from DHCP server 222. For instance, continuing with the example being described in the context of FIG. 2, each of routers 112 detects a signal that each interprets as a configuration command. Each of routers 112 configures itself, in response to the command, to satisfy any needs for unique node SIDs by issuing requests to DHCP server 222. Thereafter, when any of routers 112 require one or more unique node SIDs (e.g., to enable segment routing within one or more of ring networks 114), each such router 112 issues a request for a node SID to DHCP server 222. In some examples, each of routers 112 may request a pair of unique node SIDs for each ring network 114 for which it is a member. In addition, one or more of routers 112 may be members of other networks (i.e., non-ring networks). Each such router 112 may therefore request additional unique node SIDs that may be used for other networks or for other purposes. Accordingly, each of routers 112 may make numerous requests to DHCP server 222 for unique SIDs. In the example being described, although each of routers 112 may be individually configured to communicate with DHCP server 222 when requesting node SIDs, each of routers 112 are configured in the same way, thereby reducing the administrative burden.

To illustrate the use of ring and non-ring node SIDs, consider the following example. Router 112C6 requests an IGP-prefix SID 201 for its loopback address. Router 112C6 also requests a pair of ring SIDs 202 (clockwise) and 203 (anticlockwise) for use within ring 114C. Router 112C6 advertises these three node SIDs in the IGP. Router 112A3/112C2 also requests an IGP-prefix SID 204 for its loopback address, in addition to any other node SIDs it requires, and advertises it in the IGP.

In FIG. 2, if router 112B5 wishes to send packet 101 to router 112C6, it may use SID 201; however, this non-ring SID does not have the advantage of ring protection within ring 114C. As shown in FIG. 2, however, router 112B5 can alternatively send the packet using a SID stack 210 that includes SID 204 (at the top of the stack) followed by SID 202 (just below SID 204). Stack 210 would direct the packet first to router 112A3/112C2, whereupon the packet enters ring 114C, and then to router 112C6 in a clockwise direction. This approach has the advantage of ring protection within ring 114C. More elaborate SID stacks can be used to take advantage of ring protection within other rings along the path.

Figure 3:
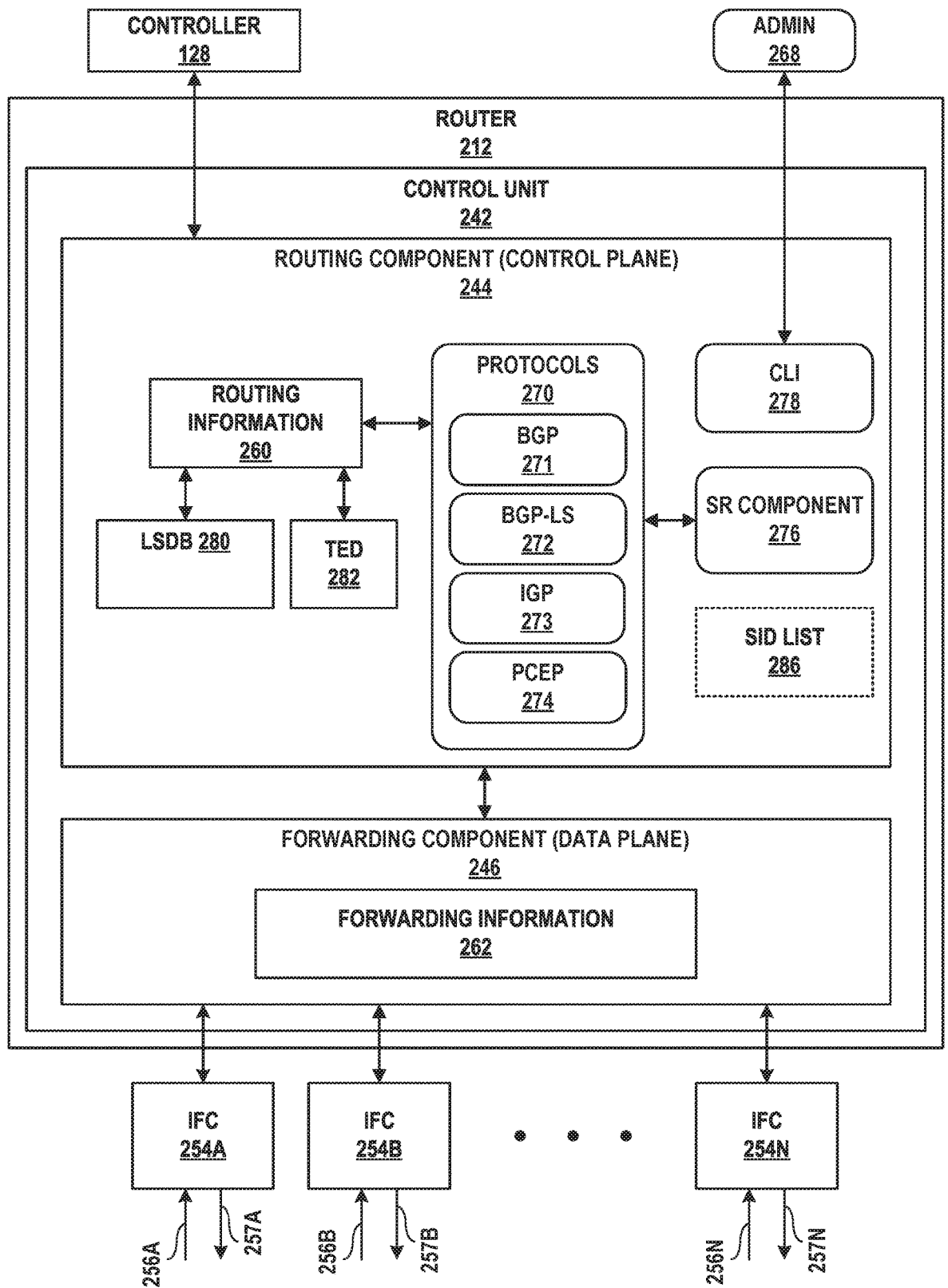
FIG. 3 is a block diagram illustrating an example router capable of operating in accordance with the techniques described herein.

FIG. 3 is a block diagram illustrating an example router 212 capable of operating in accordance with the techniques described herein. Router 212 may represent an example implementation of any of routers 112 of FIG. 1A, FIG. 1B, FIG. 1C, FIG. 1D, or FIG. 2. While described with respect to router 212, the techniques described herein may be implemented by any other type of network device capable of implementing segment routing.

In the example of FIG. 3, router 212 includes interface cards 254A-254N ("IFCs 254") that receive and send data units, such as packet flows, via network links 256A-256N and 257A-257N, respectively. Router 212 may include a chassis (not shown) having a number of slots for receiving a set of cards, including IFCs 254. Each card may be inserted into a corresponding slot of the chassis for electrically and/or optically coupling the card to routing component 244 via high-speed switch (not shown), which may comprise, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 212 may interface with links of a network.

In general, router 212 may include a control unit 242 that determines routes of received packets and forwards the packets accordingly via IFCs 254. In the example of FIG. 3, control unit 242 includes routing component (control plane) 244 that configures and controls packet forwarding operations applied by forwarding component (data plane) 246.

Routing component 244 provides an operating environment for various routing protocols 270 that execute at different layers of a network stack. Routing component 244 is responsible for the maintenance of routing information 260 to reflect the current topology of a network and other network entities to which router 212 is connected. In particular, routing protocols periodically update routing information 260 to accurately reflect the topology of the network and other entities based on routing protocol messages received by router 212. The protocols may be software processes executing on one or more processors. For example, routing component 244 includes network protocols that operate at a network layer of the network stack, which are typically implemented as executable software instructions.

In the example of FIG. 3, protocols 270 may include Border Gateway Protocol (BGP) 271 to exchange routing and reachability information among routing domains in a network and BGP-LS 272 to exchange traffic engineering and segment routing policy information among routing domains in the network. The BGP-LS protocol is described in additional detail in H. Gredler, et al., "North-Bound Distribution of Link-State and Traffic Engineering (TE) Information using BGP," Internet Engineering Task Force (IETF) RFC 7752, March 2016, the entire contents of which are incorporated herein by reference.

Protocols 270 may also include IGP 273 to exchange link state information and facilitate forwarding of packets or other data units between routers within each of the routing domains. In some examples, IGP 273 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 273 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 273 may include IS-IS extensions that support traffic engineering, as described in RFC 5305, by T. Li et al., entitled "IS-IS Extensions for Traffic Engineering," dated October 2008. In some examples, router 212 may include both an OSPF component and an IS-IS component.

Protocols 270 may also include configuration protocols. For example, protocols 270 may include PCEP 274 in accordance with RFC 5440, by J P. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples where router 212 comprises an ingress router, controller device 128 (see, e.g., FIG. 1C, FIG. 1D, and FIG. 2) may configure router 212 with SID list 286 for a segment routing tunnel via PCEP 274 or a NETCONF component (not shown). Protocols 270 may include other routing protocols (not shown), such as Label Distribution Protocol (LDP), Resource Reservation Protocol with Traffic Extensions (RSVP-TE), routing information protocol (RIP), or other network protocols.

Routing component 244 includes a segment routing (SR) module or component 276 to implement segment routing techniques that specify how router 212 may provision and advertise SIDs for adjacency segments, prefix segments, or binding segments. As described in FIG. 1A and FIG. 1B, an ingress router may use the SIDs to steer a packet through a controlled set of instructions, called segments, by prepending the packet with a SID label stack in a segment routing header.

In the example of FIG. 3, routing engine 244 includes a command line interface (CLI) 278 that provides access for an administrator ("admin") 268 to monitor, configure, or otherwise manage router 212. Admin 268 may instruct router 212 via CLI 278 to configure aspects of router 212, including aspects relating to routing, and provisioning adjacency and/or node SIDs.

By executing the routing protocols, routing component 244 identifies existing routes through the network and determines new routes through the network. Routing component 244 stores routing information 260 that includes, for example, known routes through the network. Forwarding component 246 stores forwarding information 262 that includes destinations of output links 257. Forwarding information 262 may be generated in accordance with routing information 260.

Routing component 244 includes a link state database (LSDB) 280 for storing domain topology information including SIDs and labels for provisioned segments, e.g., adjacency segments, prefix segments, and binding segments, within the routing domain of router 212. The contents of LSDB 280 are maintained in accordance with an IGP 273 and have the scope of a single routing domain. Routing component 244 further includes a Traffic Engineering Database (TED) 282 that augments LSDB 280 with TE link attributes. Each of LSDB 280 and TED 282 may be in the form of a variety of data structures, such as a number of tables, link lists, radix trees, databases, flat files, or other data structures.

In examples where router 212 comprises an ingress router of an inter-domain segment routing tunnel, routing component 244 may further include a SID list 286 for the inter-domain segment routing tunnel. Routing component 244 may store SID list 286 for the inter-domain segment routing tunnel. Based on SID list 286, routing component 244 may create a segment routing label stack for the inter-domain segment routing tunnel. Upon receipt of packets destined for the egress router of the inter-domain segment routing tunnel, forwarding component 246 appends the segment routing stack onto the packets and forwards the packets in accordance with the segment routing label stack.

Although described for purposes of example with respect to a router, router 212 may be more generally a network device having routing functionality, and need not necessarily be a dedicated routing device. The architecture of router 212 illustrated in FIG. 3 is shown as an example. The techniques of this disclosure are not limited to this architecture. In other examples, router 212 may be configured in a variety of ways. In one example, some of the functionally of control unit 242 may be distributed within IFCs 254. In another example, control unit 242 may comprise a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

In FIG. 3, and in accordance with one or more aspects of the present disclosure, admin 268 may configure router 212 to request segment identifiers from a DHCP server. For instance, in an example that can be described with reference to FIG. 3, command line interface 278 of router 212 detects input from admin 268. Command line interface 278 determines that the input corresponds to information about requesting segment identifiers, and includes an address of a DHCP server (e.g., DHCP server 222 of FIG. 2). Command line interface 278 stores the address in segment routing module 276.

Router 212 may request one or more unique segment identifiers. For instance, in FIG. 3, segment routing module 276 determines that router 212 is a member of a ring network. Router 212 thus determines that it has a need for a pair of unique segment identifiers, for use in implementing segment routing on the ring network. Segment routing module 276 causes router 212 to communicate with the previously-identified DHCP server (at the address previously identified by admin 268), requesting a pair of segment identifiers. Segment routing module 276 of router 212 receives the requested pair of segment identifiers, and designates one of them as associated with routing packets to router 212 in the clockwise direction around the ring network. Segment routing module 276 designates another one of the segment identifiers as associated with routing packets to router 212 in the counterclockwise direction around the ring network.

Router 212 may advertise routes and may receive advertised routes. For instance, segment routing module 276 causes protocols 270 to advertise routes for reaching router 212 within the ring network in both the clockwise and counterclockwise directions. Segment routing module 276 may also receive advertised routes from other routers 212. Such received advertised routes may identify how to reach such other routers 212 in both clockwise and counterclockwise directions around the ring network. Control plane 244 of router 212 may store the received advertised routes within routing information 260. Control plane 244 may update forwarding information 262 to reflect information within routing information 260.

Router 212 may route a packet. For instance, still referring to FIG. 3, one or more of IFCs 254 may receive one or more packets via network links 256. Data plane 246 may identify, based on a segment routing label included within the packets, a destination node for the packet. Data plane 246 may consult forwarding information 262 and determine that the packet is to be routed in the clockwise direction within the ring network of which router 212 is a member. Data plane 246 may forward the data packet over one or more of IFCs 254.

Modules illustrated herein (e.g., SID allocation module 224, segment routing module 276, modules 271, 272, 273, and 274) and/or described in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
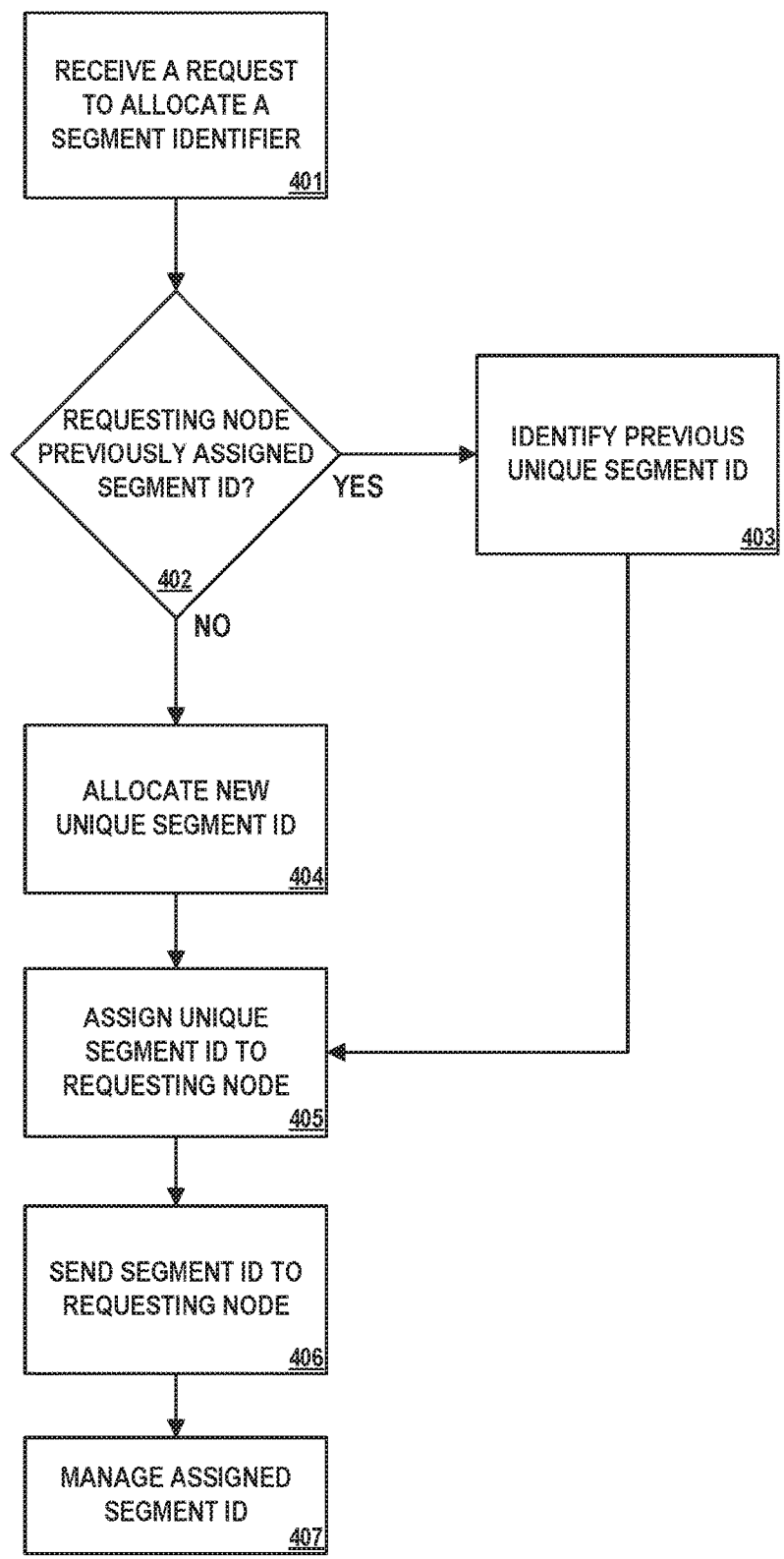
FIG. 4 is a flow diagram illustrating operations performed by an example DHCP server in accordance with one or more aspects of the present disclosure.

FIG. 4 is a flow diagram illustrating operations performed by an example DHCP server in accordance with one or more aspects of the present disclosure. FIG. 4 is described below within the context of DHCP server 222 of FIG. 2. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, DHCP server 222 may receive a request to allocate a segment identifier (401). For example, with reference to FIG. 2, router 112A6 determines that it is part of ring network 114A, and that packets are routed within ring network 114A using node SIDs in a segment routing implementation. Router 112A6 further determines that in order for packets to be routed to router 112A6, router 112A6 will need to announce or advertise two node SIDs: one that is used for packets being routed in a clockwise direction around ring network 114A to router 112A6, and another that is used for packets being routed in a counterclockwise direction around ring network 114A to router 112A6. Router 112A6 also determines that it has been configured to obtain SIDs from DHCP server 222. Router 112A6 outputs, over ring network 114A and network 115B, a request for a unique node SID to DHCP server 222. Network system 200 routes the request to DHCP server 222. DHCP server 222 detects the request and determines that the request corresponds to a request to allocate a segment identifier for router 112A6.

In some examples, and as described herein, each of routers 112 in a ring network may require more than one node SID. In such an example, each of routers 112 may issue a single request for a pair of unique node SIDs (or generally, a request for a specified number of node SIDs). DHCP server 222 may respond to such a request by allocating the specified number of node SIDs and returning the specified number of node SIDs to the requesting router 112. In other examples, one or more of routers 112 may issue separate and/or independent requests to DHCP server 222 for node SIDs, even where multiple node SIDs are required by a given router 112. As previously described, some routers 112 may be members of multiple ring networks 114 (e.g., router 112A2/112C1), and in some implementations, each membership in a different ring network 114 may necessitate a different pair of unique node SIDs being required for each ring network membership. In such an example, router 112A2 may issue to DHCP server 222 four requests for unique node SIDs, along with additional requests for any additional network on which router 112A2 may reside.

DHCP server 222 may determine whether the requesting node has previously been assigned a segment identifier (402). For example, again referring to FIG. 2, SID allocation module 224 of DHCP server 222 evaluates the request to allocate a segment identifier, and identifies router 112A6 as the node making the request for a unique node SID. SID allocation module 224 determines whether router 112A6 previously was assigned a unique node SID. If the requesting node had not previously requested a node SID, SID allocation module 224 allocates a new unique, unused SID from SID block 226 (NO path from 402 and 404). SID allocation module 224 assigns the new unique node SID to router 112A6 (405).

However, if the requesting node has previously been assigned a segment identifier, SID allocation module 224 identifies the previously-assigned node SID (YES path from

402 and 403). SID allocation module 224 evaluates whether the previously-assigned node SID is available. If possible (e.g., if the previously-assigned SID is available), SID allocation module 224 assigns the previously-assigned node SID to router 112A6 (405). In some examples, the previously-assigned node SID may have been reassigned or used for another purpose, in which case the previously-assigned node SID would not be available, and a new segment identifier would have to be allocated and assigned.

DHCP server 222 may send the segment identifier to the requesting node (406). For example, referring again to FIG. 2, DHCP server 222 outputs the assigned unique node SID over network 115B, and network system 200 routes it to router 112A6. Router 112A6 receives the assigned node SID and stores it. In some examples, router 112A6 may use the SID to advertise routes in the clockwise or counterclockwise direction in ring network 114A.

DHCP server 222 may manage the assigned segment identifier (407). For example, SID allocation module 224 of DHCP server 222 may perform administrative tasks associated with the assigned segment ID. In some examples, assigning a node SID to router 112A6 may involve administering a lease to the node SID, and such administrative tasks may therefore involve keeping track of lease expiration. Such tasks may also include ensuring that no conflicting SIDs are assigned before lease expiration. SID allocation module 224 may renew leases at appropriate times, and may update assignments as leases expire. SID allocation module 224 may also generally ensure that SID assignments are stable and are assigned from the correct block.

Note that in the example described in connection with FIG. 4, an attempt is made to assign the same SID to a given node that has previously been assigned a SID. For instance, if router 112A6 requests and is assigned a unique node SID (e.g., node SID "25") by DHCP server 222, and then router 112A6 goes offline, DHCP server 222 may still maintain or reserve node SID "25" for router 112A6 for a period of time. If router 112A6 eventually comes back online, and requests a unique node SID, SID allocation module 224 of DHCP server 222 may determine that node SID "25" was previously assigned to router 112A6, and will again assign node SID "25" to router 112A6 (assuming that DHCP server 222 has not assigned node SID "25" to another requester in the interim). This functionality is similar to that associated with DHCP servers that allocate IP addresses to devices on a network, in that DHCP servers typically attempt to repeatedly assign the same IP address to the same device (e.g., as defined by the device's MAC address).

As described herein, however, each of routers 112 may have a need for multiple unique node SIDs, particularly if the router 112 is a member of one or more ring networks. Accordingly, to implement a corresponding procedure for assigning the same node SID (or set of node SIDs) to the same device, each device requesting a node SID may include an additional field within each node SID request. The additional field may identify which of the multiple node SIDs used by the device is being requested. If, for example, a given device uses five node SIDs, a request may identify an IP address and a node SID index number. For the first node SID being used by the device, the request may specify the IP address and the node SID index number ("1"), separated, for example, by a comma (e.g., 10.1.1.4, 1). Similarly, for the third node SID being used by the device, the device may specify its IP address along with the node SID index number "3" (e.g., 10.1.1.4, 3). The format and procedure described above for specifying which of multiple node SIDs is an example, however, and other formats and procedures for distinguishing multiple node SIDs when issuing requests to DHCP server 222 are possible.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of systems and devices (e.g., routers 112, DHCP servers 122, controllers 128, DHCP servers 222, as well as others) are shown within the illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
receiving, by a computing system comprising a dynamic host configuration protocol (DHCP) server configured to execute DHCP protocol, and from a routing node on a network, a request to allocate a segment identifier for use in a segment routing network, wherein receiving the request includes receiving the request as a DHCP request, and wherein the request includes information distinguishing the request from another request by the routing node;
dynamically allocating, by the computing system and from a block of addresses, an assigned segment identifier to the routing node by configuring the block of addresses as a block of numeric identifiers to be used as identifiers instead of network addresses;
responding to the request by outputting as a DHCP response, by the computing system and over the network to the routing node, information about the assigned segment identifier;
determining that a lease associated with the assigned segment identifier has expired;
after determining that the lease has expired, receiving, by the computing system and from the routing node, a second request to allocate a segment identifier, wherein the request includes the distinguishing information; and
reallocating, by the computing system and based on the distinguishing information, the assigned segment identifier to the routing node.

2. The method of claim 1, wherein the network is at least one of: a ring network, an Anycast network, an SRv6 network, an SRv6+ network, or an SRm6 network.

3. The method of claim 1, wherein the request to allocate a segment identifier includes:
  receiving a request to allocate a plurality of segment identifiers.

4. The method of claim 1, wherein allocating the assigned segment identifier includes:
  allocating a node segment identifier.

5. The method of claim 1, wherein allocating the assigned segment identifier includes:
  allocating a globally unique segment identifier.

6. The method of claim 1, wherein allocating the assigned segment identifier includes:
  determining whether the routing node has previously been assigned a segment identifier; and
  responsive to determining that the routing node has previously been assigned a previous segment identifier, reassigning the previous segment identifier to the routing node.

7. The method of claim 6, wherein reassigning the previous segment identifier to the routing node includes:
  verifying that the segment identifier is available.

8. The method of claim 1, further comprising:
  renewing the lease at an appropriate time.

9. The method of claim 1, wherein reallocating the assigned segment identifier includes:
  ensuring that no conflicting segment identifiers are assigned before lease expiration.

10. The method of claim 1, wherein receiving a request to allocate a segment identifier includes:
  receiving a request for a pair of unique segment identifiers.

11. The method of claim 10, wherein allocating the assigned segment identifier includes:
  allocating a pair of assigned unique segment identifiers.

12. The method of claim 11, wherein responding to the request includes:
  outputting information about the pair of globally unique segment identifiers.

13. The method of claim 12, further comprising:
  maintaining the pair of assigned unique segment identifiers.

14. The method of claim 1, further comprising:
  responding to the second request by outputting, by the computing system and over the network to the routing node, information about the assigned segment identifier.

15. A system comprising:
  a storage system; and
  processing circuitry comprising a dynamic host configuration protocol (DHCP) server configured to execute DHCP protocol, wherein the processing circuitry has access to the storage system and is configured to perform operations comprising:
  receiving, from a routing node on a network, a DHCP request to allocate a segment identifier for use in a segment routing network, wherein the request includes information distinguishing the request from another request by the routing node,
  dynamically allocating, from a block of addresses, an assigned segment identifier to the routing node by configuring the block of addresses as a block of numeric identifiers to be used as identifiers instead of network addresses,
  responding to the request by outputting as a DHCP response, over the network to the routing node, information about the assigned segment identifier,
  determining that a lease associated with the assigned segment identifier has expired,
  after determining that the lease has expired, receiving, from the routing node, a second request to allocate a segment identifier, wherein the request includes the distinguishing information, and
  reallocating, based on the distinguishing information, the assigned segment identifier to the routing node.

16. A non-transitory computer-readable medium comprising instructions that, when executed, configure processing circuitry of a computing system comprising a dynamic host configuration protocol (DHCP) server configured to execute DHCP protocol to:
  receive, from a routing node on a network, a DHCP request to allocate a segment identifier for use in a segment routing network, wherein the request includes information distinguishing the request from another request by the routing node;
  dynamically allocate, from a block of addresses, an assigned segment identifier to the routing node by configuring the block of addresses as a block of numeric identifiers to be used as identifiers instead of network addresses;
  respond to the request by outputting as a DHCP response, over the network to the routing node, information about the assigned segment identifier;
  determine that a lease associated with the assigned segment identifier has expired;
  after determining that the lease has expired, receive, from the routing node, a second request to allocate a segment identifier, wherein the request includes the distinguishing information; and
  reallocate, based on the distinguishing information, the assigned segment identifier to the routing node.

* * * * *